Dec. 18, 1951  J. E. SNYDER  2,579,443

TEAR TAPE

Filed March 28, 1947

INVENTOR:
JAMES E. SNYDER
BY  R. H. Waters, Attorney

UNITED STATES PATENT OFFICE 2,579,443

TEAR TAPE

James E. Snyder, Akron, Ohio, assignor to Wingfoot Corporation, Akron, Ohio, a corporation of Delaware Application March 28, 1947, Serial No. 737,910

1 Claim. (Cl. 229—51)

This invention relates to a package with a tear tape for opening the package enclosed in rubber hydrochloride film or other heat-sealable plastic film and is particularly designed for use with packages made of film which is highly tear resistant, such as a film of rubber hydrochloride, polyethylene (known commercially as Polythene), copolymer of vinyl chloride and vinylidene chloride (known commercially as Saran), etc.

The tear tape is made of the plastic of the wrapping material, reinforced with a material of high tensile strength, preferably by lamination of the two or more materials. The surface of the tear tape adjacent the wrapper is composed of the plastic, and the plastic of the tear tape and the plastic of the wrapper are preferably heat-sealed together although an adhesive or solvent seal may be used. The material of high tensile strength contained in the tear tape is, in a preferred form of the invention, regenerated cellulose. Other materials of high tensile strength which may be used include paper, cloth, scrim, thread, etc. If the tear tape is laminated, the plastic lamina and the lamina of high tensile strength are united by adhesive or in any other suitable manner.

The invention will be more particularly described in connection with the use of rubber hydrochloride as the wrapper and a tear tape of rubber hydrochloride film adhesively laminated to regenerated cellulose, with the rubber hydrochloride of the tear tape heat-sealed to the wrapper.

The rubber hydrochloride film of the wrapper and the rubber hydrochloride film of the tear tape need not be of the same composition. For instance, the wrapper may be unpigmented and may contain plasticizer, stabilizer, etc., to give it desirable properties for a particular packaging operation—for example, for the packaging of a frozen food—and the rubber hydrochloride of the tear tape may be pigmented, and it may be plasticized with other plasticizer than the wrapper or plasticized with a different amount of the same plasticizer or may be unplasticized, and it may or may not contain stabilizer, etc. The chief function of the rubber hydrochloride in the tear tape is to unite the tear tape to the wrapper. Usually the unplasticized film will be used because of its high tensile and low elongation under stress.

Rubber hydrochloride wrappers and other plastic wrappers are especially demanded where high resistance to the passage of moisture vapor is required. The rubber hydrochloride wrapper or bag or other form of package enclosure may be made of rubber hydrochloride film of different thickness; for example, the rubber hydrochloride film may be as thin as about .0007 inch or less up to .0025 inch or more. The thinner films may be made by stretching a heated thicker film, and stretching increases the tensile strength of the film in the direction in which it is stretched.

The rubber hydrochloride packages made from any of these different thicknesses of rubber hydrochloride film are difficult to open, except that if made from film which has been stretched, the film will tear rather easily in the direction in which it has been stretched. Because of the difficulty of opening packages enclosed in rubber hydrochloride and films of other plastics, such as, for example, those mentioned, and particularly packages made from unstretched film, there has been a demand for a tear tape which will easily open them. The plastics alone are not satisfactory for tear tapes because of their tendency to stretch when placed under tension.

The regenerated cellulose laminated to the rubber hydrochloride or other plastic to form the preferred tear tape of this invention may be coated or uncoated with a moistureproofing lacquer. If coated, the coating may be on one or both sides of the regenerated cellulose, and either side may be laminated to the plastic. The regenerated cellulose may, for example, be .001 to .002 inch thick, more or less. In a preferred form of tape a thin gauge of rubber hydrochloride is laminated to a thick gauge of regenerated cellulose to obtain maximum tensile strength at minimum cost. For example, a satisfactory tape may be made by adhesively uniting .001 inch rubber hydrochloride film to .0015 inch regenerated cellulose film.

The drawings illustrate several different types of tear tape and a package provided with the tear tape:

Figure 1:
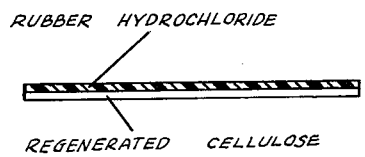
Figs. 1–4 are sections through tear tapes of different designs.

In Fig. 1 the tear tape is shown as being perfectly flat and composed of plies of regenerated cellulose and rubber hydrochloride. The plies are united by a suitable adhesive, not shown.

Figure 2:
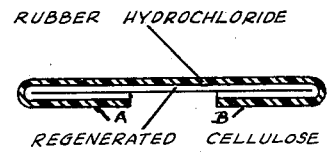

Fig. 2 shows a modified form of tear tape in which the opposite edges of the tape are folded under. The rubber hydrochloride of the tear tape—whatever the design of the tear tape—is united to the inner surface of the rubber hydrochloride wrapper. In using this tape, it is either the outer surface of the folded-under ends A and B or the opposite surface of the tape which will be united to the wrapper. The regenerated cellulose surfaces of the ends A and B may be united to the surfaces they contact by an adhesive; or if they be coated with nitrocellulose or other heat-sealable coating, they may be heat-sealed.

Figure 3:
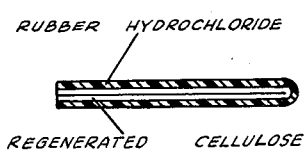

In Fig. 3 the tear tape is made by doubling over the laminated sheet. One of the exposed rubber hydrochloride surfaces is united to the inner surface of the wrapper. The two surfaces of regenerated cellulose which are thus brought into contact are united by an adhesive, or if the contacting surfaces of the regenerated cellulose be coated with a nitrocellulose or other heat-sealable coating, they may be united by heat and pressure.

Figure 4:
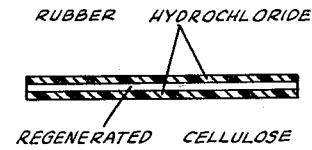

Fig. 4 shows a modified type of tear tape which is particularly strong. Here a ply of regenerated cellulose is sandwiched between plies of rubber hydrochloride. The rubber hydrochloride plies are united to the regenerated cellulose by suitable adhesive.

Figure 5:
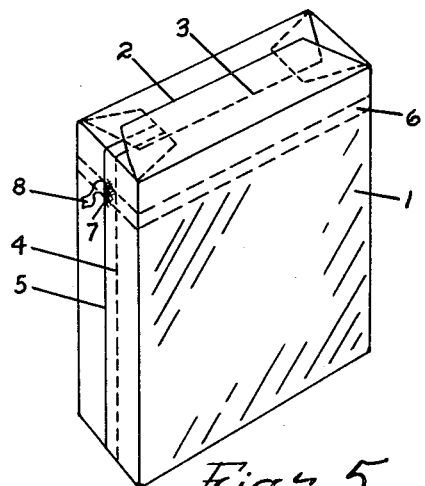
Fig. 5 is a view in perspective of a package enclosed in rubber hydrochloride film and provided with a tear tape as contemplated by this invention.

In the package illustrated in Fig. 5 a box of cigarettes or the like is enclosed in the rubber hydrochloride wrapper 1. This wrapper is applied in the usual way by wrapping it around the four sides of the box and folding over the side edges 2 and 3 at the top (as shown) and bottom of the box. The two ends of the wrapper 4 and 5 are overlapped along one side of the box. The rubber hydrochloride surface of the tear tape 6 is preferably heat-sealed to the inner surfaces of the wrapper before the wrapper is wrapped around the box. It is common practice to adhere any tear tape to any wrapper, and automatic means for doing this and providing for an end of the tear tape to protrude beyond an edge of the wrapper (as shown) are customary in the trade, except that for heat-sealing a tape to a wrapper, a heated roller would be used instead of adhesive or solvent applicators. The surfaces of the wrapper at the top and bottom folds and the side fold will be sealed together by heat, or if preferred, solvent or an adhesive may be used.

Figure 6:
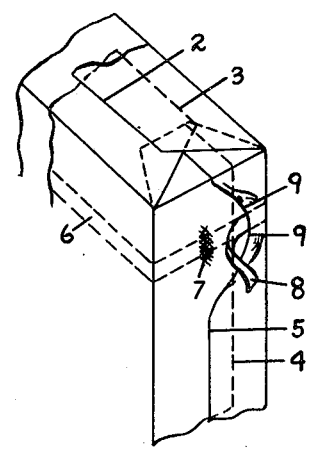
Fig. 6 is a view in perspective of the same package, partially opened.

A preferred form of tape is that shown in Fig. 1 because of its surfaces—i. e., the regenerated cellulose surface—will not adhere to the wrapper when the side seam of the package between the overlaped edges 4 and 5 is formed by the pressure of a heated element. This is advantageous because in opening the package, this surface of the tear tape may easily be separated from the overlapped portion of the end 4 of the wrapper. If it is desired to prevent an unsealed opening between the narrow strip of regenerated cellulose and this portion of the wrapper, a spot of wax or other thermo-softening adhesive is applied to the outer surface of the under portion of the wrapper opposite the tear tape. A spot of wax 7, for this purpose, is shown in the partially opened package shown in perspective in Fig. 6. It is advantageously applied to the sheet before commencement of the packaging operation and is advantageously wide enough to seal the entire width of the tape to the package. Alternatively, the wax may be applied to the inner surface of the tear tape. It may be applied as a continuous coating or spotted. The application of the wax or other adhesive to the tear tape is preferably confined to the area which overlaps the under portion of the wrapper; i. e., between the edges 4 and 5 of Fig. 1. The under surface of the tear tab 8 (which is the end of the tear tape which protrudes from under the wrapper) may be treated with wax and be thus removably united to the wrapper, but it is preferably left free.

To facilitate starting the tear, the outer edge 5 of the wrapper may be nicked, as at 9, 9, on opposite sides of the tear tape. Such nicks may simply be slits, or some of the film may be removed.

The invention is adapted to use with different types of packages. The wrapper, preferably with the tear tape and wax (or the like) affixed, may be applied to packages of different shape. To produce the tape, any sheet of material of high tensile strength may be laminated to rubber hydrochloride or other plastic used for wrapping materials, and lamination is not essential because the plastic may be reinforced with thread or the like embedded in it or located at the surface. Different gauges of the plastic may be used in the package and the tape. The tear tape may extend the length of the wrapper although this is not necessary, and it may, for example, be desirable to use a tape which is just the length of the wrapper and falls short of extending to one end of the wrapper by just the distance it protrudes from the other end of the wrapper.

Colored tapes are preferred. This may be accomplished by using colored plastic, colored adhesive or colored reinforcing material or combinations thereof.

What I claim is:

A package which comprises a complete enclosure of rubber hydrochloride film and on the inner surfaces of the film and protruding out from one edge thereof a tear tape of regenerated cellulose laminated to rubber hydrochloride, rubber hydrochloride of the tear tape being heat-sealed to the inner surface of the wrapper throughout substantially its entire length.

JAMES E. SNYDER.

REFERENCES CITED

The following references are of record in the file of this patent:

UNITED STATES PATENTS

| Number | Name | Date |
| --- | --- | --- |
| 1,180,541 | Roden | Apr. 25, 1916 |
| 1,964,238 | Wood | June 26, 1934 |
| 2,077,396 | Church | Apr. 20, 1937 |
| 2,128,652 | Kratz | Aug. 30, 1938 |
| 2,141,252 | Prindle | Dec. 27, 1938 |
| 2,182,113 | Bronander | Dec. 5, 1939 |
| 2,285,189 | Cornack | June 2, 1942 |
| 2,291,050 | Malhiot | July 28, 1942 |
| 2,295,231 | Milmoe et al. | Sept. 8, 1942 |
| 2,322,594 | Russell | June 22, 1943 |
| 2,453,258 | Pearson | Nov. 9, 1948 |